United States Patent Office 3,149,855
Patented Sept. 22, 1964

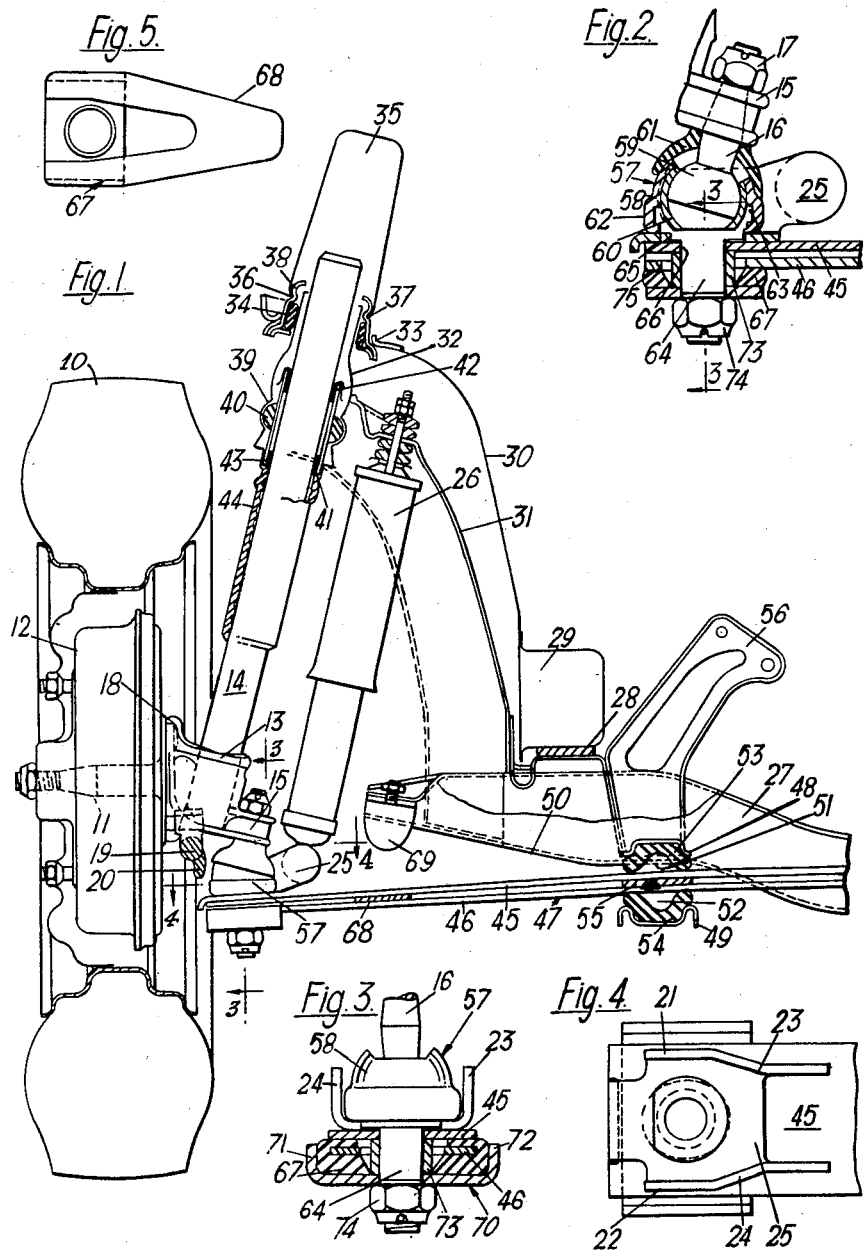

3,149,855
INDEPENDENT WHEEL SUSPENSION SYSTEM
FOR MOTOR ROAD VEHICLES
Jakob August Adloff, Mainz-Gonsenheim, and Otto Haertel, Ruesselsheim am Main, Germany, assignors to General Motors Corporation, Detroit, Mich., a corporation of Delaware
Filed July 14, 1961, Ser. No. 125,039
Claims priority, application Germany July 23, 1960
6 Claims. (Cl. 280—96.2)

This invention relates to an independent wheel suspension system for a motor road vehicle.

In an independent wheel suspension system according to the present invention a pair of substantially equi-length transverse leaf springs are each pivotally mounted independently of the other in the vehicle structure at two transversely spaced apart points, the outer ends of the upper leaf spring are each connected to a wheel carrier and the outer ends of the lower leaf spring are so connected to the upper leaf spring that relative movement between the two springs is permitted.

As is conventional in independent wheel suspensions employing transverse leaf springs, each wheel carrier is associated with a guide device which controls the angle which the wheel makes with the ground and which may be of any convenient type, for example a rod rigid with the wheel carrier and slidable in a sleeve rigid with the vehicle structure or a rigid transverse link pivotally connected to the wheel carrier and vehicle structure.

In the suspension system according to the present invention the resiliency of each of the transverse leaf springs is more fully utilized than hitherto; this is owing to the independent pivotal mounting of the two leaf springs in the vehicle structures and to the fact that the outer ends of the lower leaf springs are capable of movement in relation to the upper leaf spring.

The transverse leaf springs are conveniently eyeless; and the system has particular utility in independent front wheel suspension systems, the upper leaf spring being in this case preferably connected to the wheel carrier through a ball joint.

The scope of the invention is defined by the appended claims; and how it may be performed is hereinafter particularly described with reference to the accompanying drawings in which:

FIGURE 1 is a front elevation, partly in section, of half of an independently sprung front wheel suspension according to the invention, the other half being identical;

FIGURE 2 is a section on an enlarged scale of part of the suspension;

FIGURE 3 is a section on the line 3—3 of FIGURE 2;

FIGURE 4 is a plan of part of the suspension; and

FIGURE 5 is a plan of another part of the suspension.

A road wheel 10 (FIGURE 1) and brake drum 12 are rotatably mounted on a stud axle 11 of a wheel carrier. The carrier also includes an eye 13 and an eye 15; a guide rod 14 of a guide device is fixed in the eye 13, while a pin 16 projecting from a ball of a ball joint 57 fits in the eye 15 and is held in position by a nut 17 (FIGURE 2).

A steering knuckle arm 19, which is secured to a flange 18 of the wheel carrier, has a downwardly directed extension 20. The extension 20, in the extreme positions of the wheel, engages front edges 21 and 22 of upstanding flanges 23 and 24 on the support plate 25 of a telescopic shock absorber 26.

The structure of the vehicle comprises a cross-member 27 connected to a box-form side member 29 with a layer of resilient material 28 interposed. The outside of the side member 29 is continued upwardly to form the inside portion 30 of the wheel case. A support arm 31 is welded to the end of the cross-member 27 so that it extends upwardly approximately at right angles. A sleeve 32 is welded to the upper end of the support arm 31 and projects through an opening 33 in the wheel case 30, in which it is held by a rubber bushing 34. The opening 33 is closed by a hood-shaped sheet metal member 35 whose rim 36 fits in an annular groove 37 of a collar 38 fixed to the vehicle structure.

A rubber ring 40 is fixed to a guide 41 and fits in a groove 39 in the sleeve 32 to hold the guide in position in the sleeve. Bushes 42 and 43 are fixed in the sleeve and form bearings for the guide rod 14 as the latter reciprocates as a result of vertical movement of the wheels relatively to the vehicle structure. A rubber sleeve 44 is slipped on to the bottom end of the guide 41 to protect the sliding surfaces of the guide rod 14.

Two U-shaped yokes 48 and 49 are secured by bolts (not shown) to flanges 50 of the cross-member 27. Members 51 and 52, which are made of plastic, are bonded to the upper and lower surfaces respectively of transverse leaf springs 45 and 46 respectively, of a laminated spring 47 and have convex, substantially part cylindrical, bearing surfaces. Rubber cushions 53 and 54, which are secured to the yokes 48 and 49 respectively, have concave, substantially part cylindrical, bearing surfaces and form with the members 51 and 52 separate pivotal connections for each of the transverse springs 45 and 46. A rubber layer 55 is interposed between the leaf springs 45 and 46.

A support 56 for mounting the engine is welded to each cross-member 27.

The upper leaf spring 45 is connected to the eye 15 on the wheel carrier by the ball joint 57, the housing 58 of the ball joint 57 being attached to the upper leaf spring and the ball, as mentioned above, being attached to the eye 15 of the wheel carrier. A liner 60 (FIGURE 2) is interposed between the ball 59 and housing 58, and the entry of dirt into the joint is minimized by a rubber cap 61. The housing 58 includes an inset member 63 located in a groove 62 and having a projecting threaded stud 64. The stud 64 has a wide diameter part 65 which fits in an aperture in the support plate 25 of the telescopic shock absorber 26, and a narrow diameter part which projects through an aperture 66 in the upper leaf spring 45, through a spacer sleeve 67 and an aperture in a plate 70. The bottom leaf spring 46 is located in a groove in a rubber layer 67 which has a tongue 68 projecting between the two leaf springs 45 and 46 to a point immediately beneath a rubber buffer 69 fixed to the vehicle structure; the upper leaf spring 45 engages the buffer to limit the maximum upward deflection of the leaf springs. The plate 70 has flanges 71 and 72 which engage the edges of the layer 67. When a nut 74 is screwed on to the end of the stud, it forces the plate 70 into engagement with one end of the spacer sleeve and the other end of the sleeve into engagement with the lower side of the upper leaf spring 45. This compresses the rubber layer 67. The aperture in the lower leaf spring 46 through which the sleeve projects is sufficiently large to permit the lower spring 46 to move relatively to the upper spring 45.

The thickness and the elasticity of the rubber layers 67 and 55 are such that, during flexing of the spring 47, the relative movement between the two leaf springs is absorbed in the layers by molecular displacement in the rubber so that no sliding occurs between the layers and the leaf springs.

We claim:

1. In a motor road vehicle, an independent front wheel suspension system comprising a pair of substantially equi-length transverse leaf springs disposed one above the other, a vehicle structure, mounting means pivotally mounting each of said transverse leaf springs independently of the other at two transversely spaced apart points in said structure, a pair of wheel carriers, ball joints connecting the outer ends of said upper leaf springs to said wheel carriers, second connecting means connecting the outer ends of said lower leaf spring to said upper leaf spring so that relative movement between the two springs is permitted, resilient layers spacing said leaf springs apart at said mounting means and at the ends of said leaf springs, and a guide device associated with each wheel carrier and operative to control the angle which the wheel makes with the ground.

2. In a motor road vehicle, an independent front wheel suspension system comprising a pair of substantially equi-length eyeless transverse leaf springs disposed one above the other, a vehicle structure, mounting means pivotally mounting each of said transverse leaf springs independently of the other at two transversely spaced apart points in said structure, said mounting means preventing said leaf springs from moving apart, a pair of wheel carriers, ball joints connecting the outer ends of said upper leaf spring to said wheel carriers, second connecting means connecting the outer ends of said lower leaf spring to said upper leaf spring so that relative movement between the two springs is permitted, resilient layers spacing said leaf springs apart at said mounting means and at the ends of said leaf springs, and a guide device associated with each wheel carrier and operative to control the angle which the wheel makes with the ground.

3. In a motor road vehicle, an independent front wheel suspension system comprising a pair of substantially equi-length eyeless transverse leaf springs disposed one above the other; a vehicle structure; mounting means pivotally mounting each of said transverse leaf springs independently of the other at two transversely spaced apart points in said structure, each of said mounting means comprising a member fixed to the vehicle structure and having a concave support surface and a second member fixed to a leaf spring and having a convex bearing surface in engagement with said support surface, said mounting means preventing said leaf springs from moving apart; a layer of resilient material interposed between the springs at each pair of mounting means; a pair of wheel carriers; a ball joint interconnecting each outer end of said upper transverse leaf spring to a wheel carrier, said ball of said joint being connected to said carrier; means interconnecting said upper and lower leaf spring such that said lower leaf spring is movable relatively to said upper leaf spring, said means comprising a threaded stud on the housing of said ball, said stud projecting through apertures in said upper and lower leaf springs and in a plate, a spacer sleeve surrounding said stud and being located between the underside of said upper leaf spring and said plate, a resilient layer interposed between the underside of said upper leaf spring and said plate, said lower leaf spring being located in a groove in said resilient layer, and a nut screwed onto said threaded stud to engage said plate and thereby to compress said layer and hold the ends of said sleeve in engagement with said plate and the underside of said upper leaf spring; and a guide device associated with each wheel carrier and operative to control the angle which the wheel makes with the ground.

4. In a motor road vehicle, an independent wheel suspension system comprising a pair of eyeless transverse leaf springs disposed one above the other; a vehicle structure; mounting means pivotally mounting each of said transverse leaf springs independently of the other at two transversely spaced apart points in said structure, each of said mounting means comprising a resilient member fixed to the vehicle structure and having a concave support surface and a second member fixed to a leaf spring and having a convex bearing surface in engagement with said support surface, said mounting means preventing said leaf springs from moving apart; a layer of resilient material interposed between the springs at each pair of mounting means; a pair of wheel carriers; connecting means interconnecting each outer end of said upper transverse leaf spring to a wheel carrier; means interconnecting said upper and lower leaf spring such that said lower leaf spring is movable relatively to said upper leaf spring; and a guide device associated with each wheel carrier and operative to control the angle which the wheel makes with the ground.

5. In a motor road vehicle, an independent front wheel suspension system comprising a pair of substantially equi-length eyeless transverse leaf springs disposed one above the other; a vehicle structure; mounting means pivotally mounting each of said transverse leaf springs independently of the other at two transversely spaced apart points in said structure; said mounting means preventing said leaf springs from moving apart; a layer of resilient material interposed between the springs at each pair of mounting means; a pair of wheel carriers; a ball joint interconnecting each outer end of said upper transverse leaf spring to a wheel carrier, said ball of said joint being connected to said carrier; means interconnecting said upper and lower leaf spring such that said lower leaf spring is movable relatively to said upper leaf spring, said means comprising a threaded stud on the housing of said ball, said stud projecting through aperture in said upper and lower leaf springs and in a plate, a spacer sleeve surrounding said stud and being located between the underside of said upper leaf spring and said plate, a resilient layer interposed between the underside of said upper leaf spring and said plate, said lower leaf spring being located in a groove in said layer, and a nut screwed onto said threaded stud to engage said plate and thereby to compress said layer and hold the ends of said sleeve in engagement with said plate and the underside of said upper leaf spring; and a guide device associated with each wheel carrier and operative to control the angle which the wheel makes with the ground.

6. In a motor road vehicle an independent front wheel suspension system comprising a pair of substantially equi-length eyeless transverse leaf springs disposed one above the other; a vehicle structure; mounting means pivotally mounting each of said transverse leaf springs independently of the other at two transversely spaced apart points in said structure, each of said mounting means comprising a resilient member fixed to the vehicle structure and having a concave support surface and a plastic member bonded to a leaf spring and having a convex bearing surface in engagement with said support surface, said mounting means preventing said leaf springs from moving apart; a layer of resilient material interposed between the springs at each pair of mounting means; a pair of wheel carriers; a ball joint interconnecting each outer end of said upper transverse leaf spring to a wheel carrier, said ball of said joint being connected to said carrier; means interconnecting said upper and lower leaf spring such that said lower leaf spring is movable relatively to said upper leaf spring, said means comprising a threaded stud on the housing of said ball, said stud projecting through apertures in said upper and lower leaf springs and in a plate, a spacer sleeve surrounding said stud and being located between the underside of said upper leaf spring and said plate, a resilient layer interposed between the underside of said upper leaf spring and said plate, said lower leaf spring being located in a groove in said layer, and a nut screwed onto said threaded stud to engage said plate and thereby to compress said layer and hold the ends of said sleeve in engagement with said plate and the underside of said upper leaf spring; and a guide device associated with each wheel carrier and operative to control the angle which the wheel makes with the ground, each of said guide devices comprising a rod fixed to said carrier and slidable in a sleeve fixed to said structure.

References Cited in the file of this patent

UNITED STATES PATENTS

| | | |
|---|---|---|
| 1,598,679 | Fletcher | Sept. 7, 1926 |
| 1,679,853 | Cottin | Aug. 7, 1928 |
| 1,706,556 | Wright | Mar. 26, 1929 |
| 2,018,653 | Best | Oct. 29, 1935 |
| 2,250,247 | Ballamy | July 22, 1941 |
| 2,697,613 | Giacosa | Dec. 21, 1954 |
| 3,079,138 | Vogt | Feb. 28, 1963 |